United States Patent [19]

Masini et al.

[11] Patent Number: 4,919,458
[45] Date of Patent: Apr. 24, 1990

[54] DEVICE FOR SEALINGLY MOUNTING TUBES WHICH PASS THROUGH A WALL

[75] Inventors: Jean-Jacques Masini, Chaponost; René Chabidon, Saint Genis Leval, both of France

[73] Assignee: Atochem, Puteaux, France

[21] Appl. No.: 281,383

[22] Filed: Dec. 8, 1988

[30] Foreign Application Priority Data

Dec. 17, 1987 [FR] France ................................ 87 17655

[51] Int. Cl.⁵ .............................................. F16L 35/00
[52] U.S. Cl. .................. 285/110; 285/133.1; 285/261; 285/351; 285/911
[58] Field of Search ..................... 285/261, 133.1, 351, 285/911, 233, 110

[56] References Cited

U.S. PATENT DOCUMENTS

| | | |
|---|---|---|
| 2,983,528 | 5/1961 | Streidle . |
| 3,427,051 | 2/1969 | White et al. .................... 285/261 X |
| 3,997,197 | 12/1976 | Marsh et al. . |
| 3,998,477 | 12/1976 | Delahaye et al. . |
| 4,689,130 | 8/1987 | Masini . |

FOREIGN PATENT DOCUMENTS

| | | |
|---|---|---|
| 265773 | 10/1968 | Austria . |
| 0128818 | 12/1984 | European Pat. Off. . |
| 1998015 | 6/1968 | Fed. Rep. of Germany . |
| 2181117 | 11/1973 | France . |
| 2239637 | 2/1975 | France . |
| 1189052 | 4/1970 | United Kingdom ................ 285/261 |

Primary Examiner—Thomas F. Callaghan
Attorney, Agent, or Firm—Burns, Doane, Swecker & Mathis

[57] ABSTRACT

A tube extends through a wall of a vessel and is adapted to carry an ultraviolet emitter for use with a photochemical reaction vessel. An end of the tube disposed outside of the vessel is mounted within a support which forms a ball joint for that end of the tube. That joint allows the tube to pivot slightly in response to forces acting on the portion of the tube disposed within the vessel, thereby resisting any breaking or bending of the tube which might otherwise occur. A lip seal is disposed around the tube at a location intermediate the ball joint and the vessel to prevent the escape of fluids from the vessel past the tube.

7 Claims, 1 Drawing Sheet

U.S. Patent
Apr. 24, 1990
4,919,458
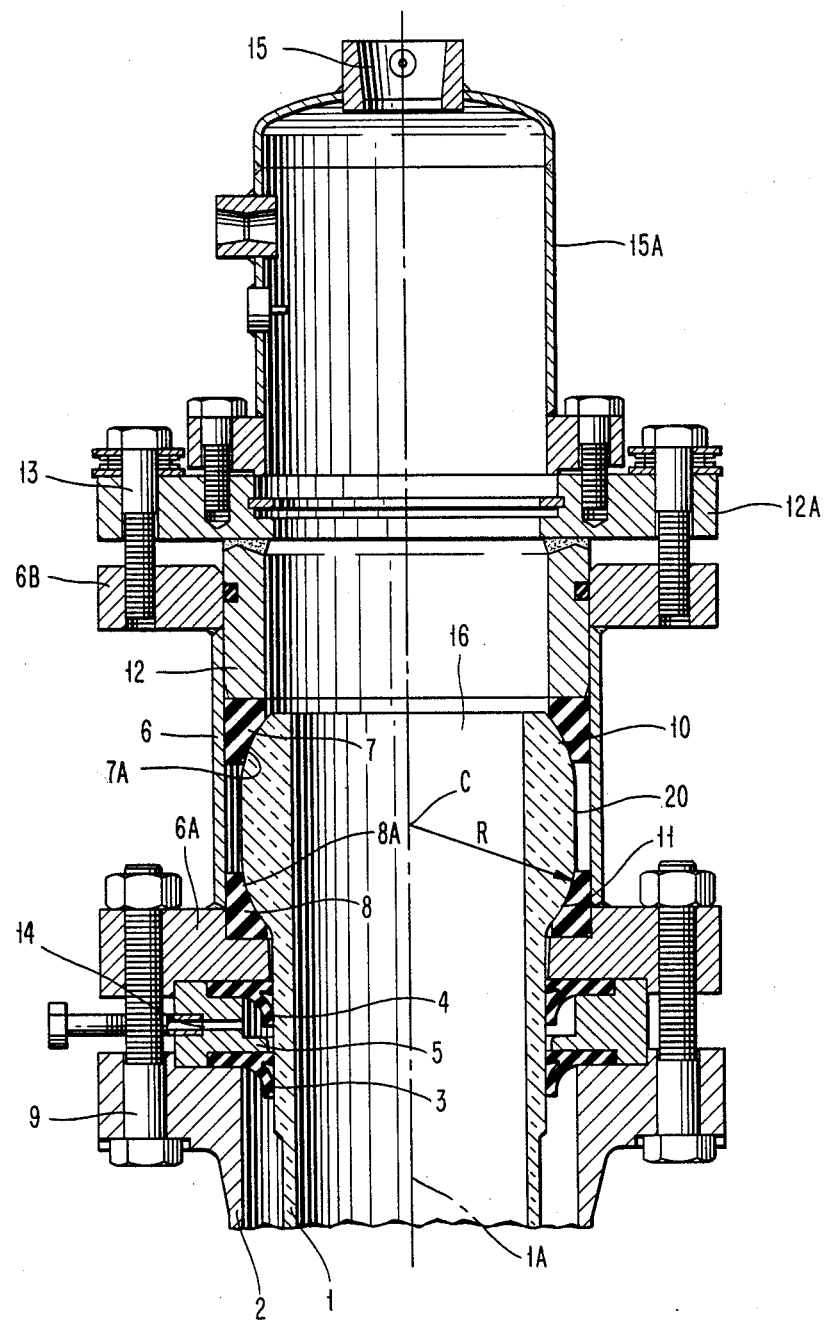

DEVICE FOR SEALINGLY MOUNTING TUBES WHICH PASS THROUGH A WALL

BACKGROUND AND OBJECTS OF THE INVENTION

1. Field of the Invention

The present invention relates to a device for sealingly mounting a tube which passes through the wall of a vessel. The invention has particular utility for enabling glass or quartz circular tubes to be used in a pressurized reaction vessel for free radical chlorination, these tubes having the function of carrying ultraviolet (U.V.) emitters.

2. Description of the Prior Art

Industrial processes which use photochemical reaction vessels are, for example, disclosed in European Patent No. 128,818 as well as in U.S. Pat. 4,689,130. Also, U.S. Pat. No. 3,998,477 discloses a general device for fixing a tube onto a nozzle of a vessel. That device, which is particularly suited for fixing a quartz tube containing a U.V. emitter onto a photochlorination reaction vessel allows, for example, quartz tubes of a diameter 60 mm and a length 3 m to be used in a reaction vessel for the synthesis of chloromethanes working at a pressure of 15 bar. That device enables a quartz tube to be sealingly mounted, i.e., fixed impermeably, while allowing the tube to move slightly. If there is significant turbulence in the reaction vessel or if the tubes are very long, rupturing of the tubes may occur, or bending thereof if the tube is made of steel, and the resulting stresses often lead to permanent deformation of ring seals located at the end of the tube outside the reaction vessel, and lip seals located intermediate the ring seals and vessel.

The applicant has now devised a new way of sealingly mounting a tube passing through the wall of a vessel which can withstand significant mechanical stresses acting on the tube by turbulent fluid and/or pressure within the vessel.

SUMMARY OF A PREFERRED EMBODIMENT OF THE INVENTION

The present invention relates to a device for sealingly mounting tube of essentially circular cross-section which passes through the wall of a vessel. An end portion of the tube situated outside the vessel forms, in conjunction with a component preferably made of flexible material, a ball joint permitting pivoting motion of the tube between the tube and the wall of the vessel. At least one elastically flexible seal disposed between the tube and vessel forms a seal and limits pivoting motion of the tube. The pivoting motion acts to relieve stresses imposed on the tube by forces occurring within the vessel.

The invention relates to any size tube made of any material. For example, the tube can be made of glass, quartz, graphite, or be based on polymers such as polytetrafluoroethylene, polypropylene, polyvinyl chloride or be based on metals or alloys such as steel, coated steel, stainless steel, nickel, copper or monel metal. The tube can be solid or hollow.

The invention is particularly suited for fragile tubes such as those made of glass or quartz like those which are used to hole U.V. emitters in a photochemical reaction vessel.

Although the invention relates to tubes of all sizes, it is preferably adapted to tubes of a diameter in the range 30 to 300 mm and of a length in the range 1 to 6 m. These tubes may be made of quartz or glass and are hollow so as to be able to hold U.V. emitting lamps and, if necessary, a cooling device. The tube is disposed almost entirely inside the vessel, except for an end thereof projecting outside the vessel which has a spherical bulbous shape centered about the longitudinal axis of symmetry of the tube. The sphere radius is greater than the external radius of the tube. A component made of flexible material is situated around this spherical part of the tube, forming with the spherical part a ball joint allowing slight rotation of the tube around the center of the sphere to absorb vibrations and particularly to allow the tube to be held against a so-called depth effect on the tube section. Customary materials are used as the flexible material for the seals include, for example, natural or synthetic rubbers, fluoro polymers, fluoro chloro polymers, ethylene propylene copolymers and the like.

The vessel to which the tube is fixed can be for example a tank, a chemical reaction vessel, or a distillation column. The invention is particularly suited to pressurized or vacuum vessels. Any suitable mechanism can be used to clamp the vessel to the flexible ball-receiving material, such as, for example a hollow cylinder partially closed-off at one end and the other end of which is fitted to the nozzle of the vessel through which the tube enters the vessel.

The impermeability of the junction between the tube and the wall of the vessel is ensured by at least one flexible seal. The kind of seal is determined by the chemical nature of the chemical reaction species which are to be used in the vessel and which will be in contact with the seal. For example, natural or synthetic rubber is used, or synthetic polymers such as fluoro polymers, fluoro chloro polymers, ethylene propylene copolymers and so on. A seal known as a "lip seal" is preferably used. According to another preferred embodiment of the invention, two lip seals are used. By "lip seal" is understood to mean all seals of the type in which areas of sealing contact are separated by an empty area. This type of seal can also be formed in such a way that the pressure of the fluid which is to be retained holds the joint against the contact surface, thus reinforcing the impermeability. This seal may comprise a metallic core or a synthetic elastic material, and may be covered with a flexible material of the rubber or synthetic elastomeric type.

According to another preferred embodiment of the invention, a partial ball joint is used, that is, a ball joint which does not allow a complete rotation but rather one of 15° or less. In the partial ball joint, the surface of the sphere is interrupted and appears as the creation of a complete sphere cut by a cylinder whose axis is common with the axis of the tube, the tube radius being less than the radius of the sphere and greater than the external radius of the tube. In this way a tube is obtained with a kind of bulb at one end, this bulb having two symmetrical sectors with reference to a principal plane of the initial sphere, the principal plane being perpendicular to the longitudinal axis of symmetry of the tube. In this preferred embodiment, the ball-receiving flexible component comprises two seals made of flexible material which bear upon the spherical sectors of the partial sphere.

BRIEF DESCRIPTION OF THE DRAWING

The objects and advantages of the invention will become apparent from the following detailed description of a preferred embodiment thereof in connection with the accompanying drawing, in which like numerals designate like elements, and in which:

The sole FIGURE depicts a longitudinal sectional view of a preferred embodiment of the invention.

DETAILED DESCRIPTION OF THE PREFERRED EMBODIMENT OF THE INVENTION

Tube 1 is attached to the nozzle 2 of a photochemical reaction vessel such as a photochlorination reaction vessel. The tube is of a conventional nature, such as a quartz tube containing a U.V. emitter. A bolster 5 locates and holds two lip seals 3 and 4 against the tube and nozzle. A sleeve 6 is welded to flanges 6A, 6B. The flanges 6A are secured to the nozzle of the vessel by bolts 9. Two seals 7 and 8 made from a flexible material form a ball joint with first and second outer peripheral spherical sectors or segments 10 and 11 of a bulbous end portion of the tube. sectors have a common radius R. The spherical sectors have a common radius R which extends from a center C lying on a longitudinal axis 1A of the tube 1. The spherical sectors 10, 11 and first and second surfaces 7A, 8A of the seals 7, 8 define interfaces therebetween which have the shape of the spherical sectors.

The tube has an opening 16 adjacent the sector 10 for receiving a U.V. emitter and/or an associated cooling device. Components 12, welded to flanges 12A, are urged against seal 7 by bolts 13 which interconnect flanges 6B, 12. This allows the seals 7 and 8 to be adjusted and compressed. An opening 14 in the bolster 5 is disposed between the two lip seals. The opening 14, which can be closed by a removable screw, can be used (when the screw is removed) as a sight to investigate whether the first lip seal 3 is leaking. A hood 15A bolted to flanges 12A contains an aperture 15 which provides access to the electrical supply to the U.V. lamp disposed inside tube 1. Not shown is a sealing system for the aperture 15 which avoids entry of the contents of the vessel in the event that tube 1 ruptures.

The ball joint formed by the spherical surfaces 10, 11 and the seals 7, 8 permits a pivoting motion of the tube about an infinite number of axes oriented transversely of the longitudinal axis of the tube, under the influence of forces acting on the part of the tube disposed within the vessel. Such pivoting motion serves to significantly relieve the stresses imposed on the tube by those forces so that the tube will not rupture. The extent of such pivoting motion is limited by the lip seals 3, 4 which also continually function to create a seal around the outer circular periphery of the tube.

The tube may be made of any material and of any size. For example the tube can be made of glass, quartz, graphite, or be based on polymers such as polytetrafluoroethylene, polypropylene, polyvinyl chloride or be based on metals or alloys such as steel, coated steel, stainless steel, nickel, copper or monel metal. The tube can be solid or hollow.

The invention is particularly suitable for fragile tubes such as those made of glass or quartz like those which are used to hold U.V. emitters in a photochemical reaction vessel.

Although the invention relates to tubes of all sizes, it is usually applied using tubes of a diameter in the range 30 to 300 mm and of a length in the range 1 to 6 m. These tubes may be made of quartz or glass.

Materials used as the flexible material for the seals 7 and 8 include, for example, natural or synthetic rubbers, fluoro polymers, fluoro chloro polymers, ethylene propylene polymers and so on.

The vessel to which the tube is fixed can be for example a tank, a chemical reaction vessel, a distillation column etc. The invention is particularly suitable for pressurized or vacuum vessels.

The kind and composition of seals 3, 4 is determined by the chemical nature of the chemical reaction species which are to be used in the vessel and which will be in contact with the seal. For example natural or synthetic rubber is used, or synthetic polymers such as fluoro polymers, fluoro chloro polymers, ethylene propylene copolymers and the like. One or more of those seals can be used as desired.

A seal known as a "lip seal" is preferably used for seals 3, 4. By "lip seal" is meant all seals of the type in which areas of sealing contact are separated by an empty area. This type of seal can be formed in such a way that the pressure of the fluid which is to be retained holds the joint against the contact surface, thus reinforcing the impermeability or sealing action. This seal may comprise a metallic core or a synthetic material conferring elasticity, covered with a flexible material of the rubber or synthetic elastomeric type.

The ball joint can be formed by a completely spherical bulb on the end of the tube 1, or by a partially spherical bulb as shown in the drawing. The latter contains spherical segments interconnected by a cylindrical portion 20 whose diameter is less than that of the spherical segments and larger than the outer diameter of the circular tube. The extent of pivotal movement of the tube permitted by such a partial sphere is preferably no greater than 15°.

The bulb is symmetrical with reference to a principal plane of the bulb, which principal plane is perpendicular to the longitudinal axis 1A of the tube.

While the invention has been described in terms of a preferred embodiment, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An apparatus comprising:
   a vessel having a wall,
   a tube extending through said wall such that an end portion of said tube is situated outside of said wall, said end portion including an enlargement having first and second outer peripheral segments spaced apart along a longitudinal axis of said tube, said first outer peripheral segment disposed farther from said wall than said second outer peripheral segment, each of said first and second outer peripheral segments being generated spherically by a common radius of generation extending from a center lying substantially on said longitudinal axis, and
   means for sealingly mounting said tube comprising:
      engaging means engaging said end portion and including first and second surface means engaging said first and second outer peripheral segments, respectively, of said end portion and defining therewith first and second interfaces having the shape of said first and second outer peripheral segments, respectively, said first and second surface means and said first and second outer peripheral segments together defining a ball joint permitting a limited pivoting motion of said tube about said center, and at least one elastically flexible seal disposed at a location intermediate said ball joint and said vessel and including means creating a seal between said vessel and a generally circular outer periphery of said tube and limiting said pivoting motion of said tube.

2. Apparatus according to claim 1, wherein said engaging means is formed of an elastically flexible material.

3. Apparatus according to claim 1, wherein said at least one seal comprises a lip seal.

4. Apparatus according to claim 1, wherein said end of said tube comprises a cylindrical surface interconnecting said first and second outer peripheral segments, said cylindrical surface having a diameter larger than an outer diameter of said tube and smaller than a common diameter of said first and second outer peripheral segments.

5. Apparatus according to claim 1, wherein a center of said ball joint lies on a longitudinal axis of said tube.

6. Apparatus according to claim 1 including clamp means for clamping said engaging means to said end of said tube and simultaneously clamping said at least one seal to said vessel.

7. Apparatus according to claim 1, wherein an end of said tube adjacent said first outer peripheral surface portion is open.

* * * * *